June 16, 1953  E. J. SMITH  2,642,235
WHEEL EXTRICATING ATTACHMENT AND CABLE
Filed Sept. 4, 1951  2 Sheets-Sheet 1

Eugene Jerry Smith
INVENTOR.

BY *[signatures]*
Attorneys

June 16, 1953  E. J. SMITH  2,642,235
WHEEL EXTRICATING ATTACHMENT AND CABLE
Filed Sept. 4, 1951  2 Sheets-Sheet 2

Eugene Jerry Smith
INVENTOR.

Patented June 16, 1953

2,642,235

UNITED STATES PATENT OFFICE 2,642,235

WHEEL EXTRICATING ATTACHMENT AND CABLE

Eugene Jerry Smith, Springfield, Ohio, assignor of twenty per cent to Leonard Smith, Springfield, Ohio Application September 4, 1951, Serial No. 244,950

1 Claim. (Cl. 242—95)

The present invention relates to certain new and useful improvements in automobile wheel extricating attachments and has more particular reference to a simple cable and winding and reeling structure therefor, together with an anchoring stake for said cable; wherein by attaching one end of the cable to the stake and winding the other end of the cable around the wheel attachment reeling structure, it is then possible to extricate the wheel from a mud hole, sand cavity, snow or ice covered surface or the like.

As the preceding statement of the invention reveals, so-called cable winding and extricating drums, reels and the like are not new. The object of the present invention is to provide novelly constructed wheel attachments which are structurally distinct and more in keeping, it is believed, with the requirements of the trade than those offered by others.

Another object of the invention is to structurally, functionally and otherwise improve upon prior art cable winding wheel attachments and, in so doing, to provide a unique means in which manufacturers, users and others will find their essential needs and requirements fully met and satisfactorily available.

A further object of the invention is to provide a simple drum with flanges at opposite ends and with adapter brackets at its inner end, whereby to thus provide a simple and economical drum construction which is easily applicable and removable and which may be conveniently carried in one's trunk compartment for readily available use.

A still further object of the invention apertains to novel cable winding and reeling means which, instead of being a drum, is actually made of a plurality of especially designed brackets. These brackets have their outer ends flared to facilitate holding the cable windings in place. The inner ends of the brackets are bent laterally and inwardly toward each other and have bolt holes to accommodate the usual studs and have, in addition, arcuate detents which engage the inner peripheral edge portion of the hub of the wheel for practical assembling and to thus stabilize the over-all multi-part reel.

Other objects and advantages will become more readily apparent from the following description and the accompanying sheet of illustrative drawings.

In the accompanying sheet of drawings wherein like numerals are employed to designate like parts throughout the views.

Figure 4:
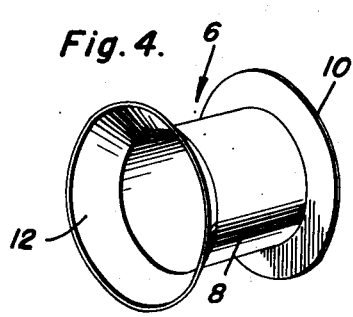
Figure 4 is a perspective view of the same.

Attention is directed at the outset to the drum per se as shown in Figure 4, as a single unit is denoted by the numerals 6 and comprises a simple open ended cylinder 8 having an annular right angularly disposed flange 10 at its inner end and a conical or bell flange 12 at its outer end. There are two adaptor and attaching brackets and these are denoted by the numerals 14—14. Each bracket is of L-shaped form and the long arm 16 is rigidly attached to the interior of the drum 8 and it projects beyond the flange 10 to render the shorter arm 18 accessively available. The short arm is provided with a notch 20. These notched arms are adapted, obviously, to be engaged over and held in place on the customary or stock studs 22. They are the usual studs on the brake drum structure 24 of the automobile axle. They are the same studs which serve to hold in place the hub portion 26 of the vehicle wheel 28. They are also the same studs which accommodate the regular applicable and removable clamping nuts 30.

It will be obvious that by removing the hub cap (not shown) and exposing the nuts 30 the latter may then be temporarily removed. The wheel 28 is of course left in place during this interval of time. Then, the attachment drum 6 is brought into play. That is to say, the brackets 14 with the notched arms 18 are mounted on the studs and then the nuts 30—30 are replaced. This serves to utilize the nuts to hold the wheel and the drum together on the studs 22. The drum projects sufficiently far beyond the wheel to accommodate the windings or coils 32 of the pull or draft cable 34. One end of the cable is attached securely at 36 to a stake 38 which is driven in the ground at the desired place. The intermediate portion of the cable is wound about the drum and the free end portion 40 is held in the hand of the user in a well known manner.

The brackets 14 project beyond the right angularly disposed flange 10. This flange is of a diameter so that it may fit into the recession 26 of the wheel hub. It may even function, to a limited extent, as an anti-splash or mud guard, tending to keep a certain amount of mud from splashing in the pocket defined by the recession 26. The brackets 14 are readily accessible for application and removal and the arrangement is such that the nuts 30—30 are also readily available. It is therefore easy to slip the brackets in position and bind them tightly with the clamping nuts. The usual socket wrench may be employed in applying and removing the nuts 30 in customary fashion.

Figure 5:
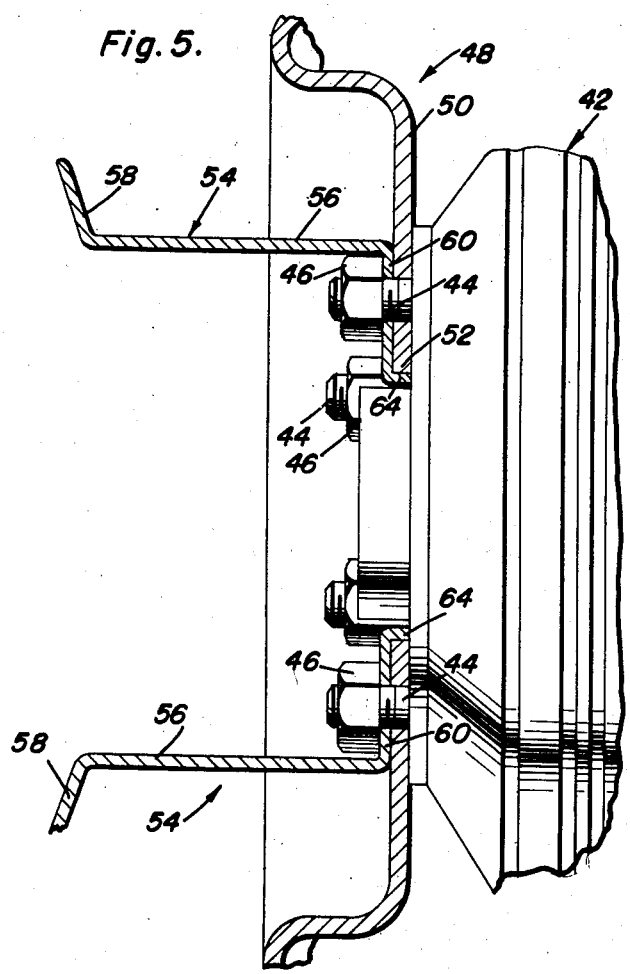
Figure 5 is a view in section and elevation similar to Figure 2 and showing a modified winding attachment; namely, a multi-part reel made up of novel brackets.
Figure 7:
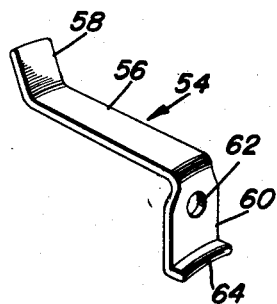
Figure 6:
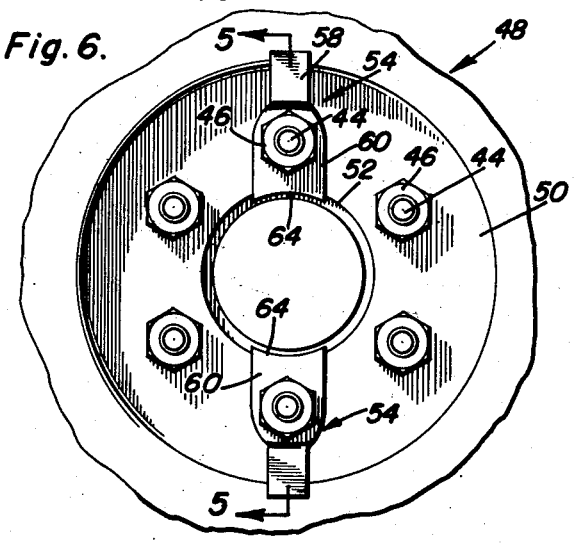
Figure 6 is a view on a smaller scale observing the structure of Figure 5 in a direction from left to right; and, Figure 7 is a perspective view of one of the especially designed reel forming brackets.

Reference is now had to the modified knockdown winding reel construction shown in Figures 5 and 6. In these two figures only two of the brackets are shown to make up a simple minimum type of a reel. Generally however there will be at least three or four such brackets to provide a satisfactory winding and reeling assemblage. In Figure 5 of the brake drum structure is denoted by the numeral 42 and is provided with conventional studs 44 with complemental nuts 46. The wheel is denoted at 48 and has the usual hub portion 50 with bolt holes through which the studs extend. The inner peripheral edge portion of the hub is mentioned here since it has a purpose and it is denoted by the numeral 52.

Figure 1:
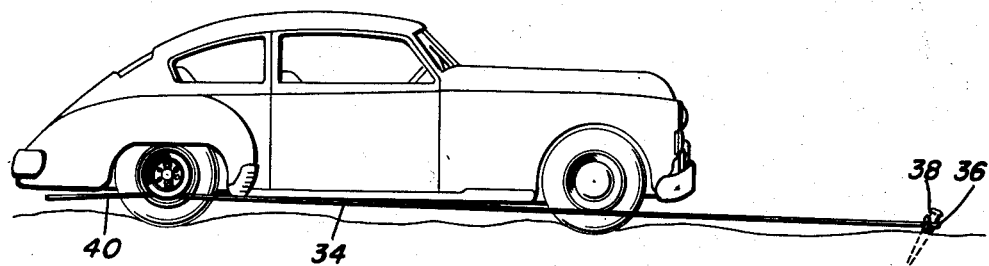
Figure 1 is a side elevational view showing a stalled automobile and showing, additionally, the stake, cable and wheel attached extricating drum.
Figure 3:
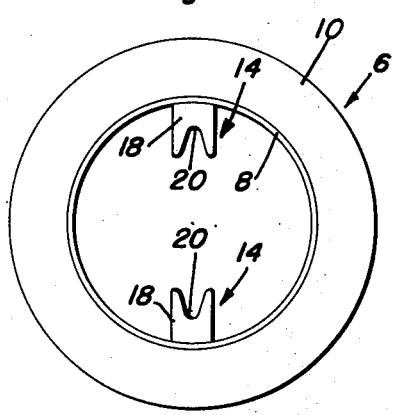
Figure 3 is an inside end view of the drum.
Figure 2:
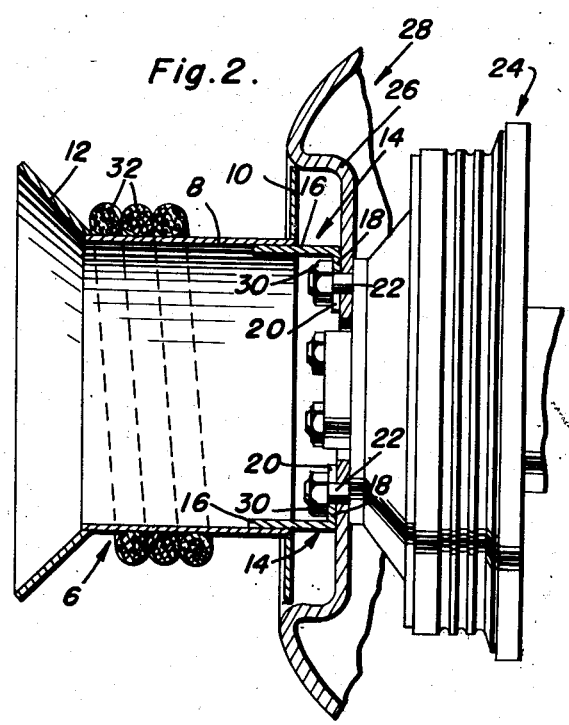
Figure 2 is a view in section and elevation showing the old or conventional parts, primarily in elevation, and the improved drum in section.

The novel reel make-up brackets are denoted by the numerals 54. Each comprises an arm portion 56 having an outer free end portion 58 which is laterally directed to facilitate maintaining the cable winding on the reels in an obvious manner. The laterally bent end portion of each bracket is denoted, at the inner end, by the numeral 60 and this is, in effect, an adaptor ear. The ear has a stud opening 62 to permit passage of the stud therethrough and application of the assembling and retaining nut means 46 as shown in Figure 5. It is important to note that this ear is preferably widened somewhat and that the terminal portion has a lateral bend 64 which constitutes a stabilizing lug or detent. This is preferably arcuately bent so that it bears against and conforms to the coacting curvature of the peripherial edge portion 52 of the hub of the wheel. With this type of a reel, any number of brackets from two to five or six may be utilized. The brackets are all of standard constructions depending on the car on which they are applied. The automobile owner will purchase sufficient brackets for his needs and may carry them in a tool box. Then when it becomes necessary to extricate himself from a hole he does so in an obvious manner, the same manner as depicted in Figure 1 of the drawings.

It will be clear that both forms of the invention are characterized by reeling and winding means which takes the form of an attachment for the existing or stock studs on a vehicle brake drum construction. Also, there are brackets provided with lateral inner ends to engage over the studs and to thus be held in place by the usual or stock clamping nuts.

It is reiterated at this stage that the invention has to do, generally speaking, with the structural means which seeks to improve upon and reduce the number of parts entering into the overall combination, thereby not only increasing the efficiency of the structure as a whole, but rendering the same less costly to manufacture and to otherwise simplify factors of manufacturing, assembling, sale and application and removal.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials or rearrangement of parts may be resorted to in actual practice so long as no departure is made from the invention as claimed.

Having described the invention, what is claimed as new is:

In combination, a vehicle axle embodying a brake drum having wheel supporting and retaining studs and accompanying clamping nuts, a wheel having a hub portion mounted on said studs and held in place by said nuts, cable winding means embodying a plurality of duplicate rigid readily applicable and removable brackets, the outer ends of said brackets being directed laterally outward, the inner ends of said brackets being directed laterally and inwardly toward each other and having openings, said studs extending through said openings and being held in place by said nuts, the terminal portions of the laterally directed inner ends of the respective brackets are provided with arcuate lateral lugs and said lugs engaging the inner peripheral edge of said wheel hub.

EUGENE JERRY SMITH.

References Cited in the file of this patent

UNITED STATES PATENTS

| Number | Name | Date |
|---|---|---|
| 1,151,819 | Pittman | Aug. 31, 1915 |
| 1,445,509 | Hall | Feb. 13, 1923 |
| 1,495,534 | Schmidt | May 27, 1924 |
| 2,377,881 | Hans | June 12, 1945 |
| 2,517,723 | Schoditsch | Aug. 8, 1950 |